(12) United States Patent
Niemczuk et al.

(10) Patent No.: US 12,433,513 B2
(45) Date of Patent: Oct. 7, 2025

(54) DEVICE FOR NON-INVASIVE BLOOD GLUCOSE CONCENTRATION MEASUREMENT

(71) Applicant: GEKKO PHOTONICS SPOLKA Z OGRANICZONA ODPOWIEDZIALNOSCIA, Wroclaw (PL)

(72) Inventors: Jakub Niemczuk, Wroclaw (PL); Bartosz Kawa, Wroclaw (PL); Maciej Ptak, Wroclaw (PL); Michal Cieslak, Radom (PL); Marta Turkiewicz, Klodzko (PL); Krzysztof Adamski, Kepno (PL); Karolina Orlowska, Belchatow (PL)

(73) Assignee: GEKKO PHOTONICS SPOLKA Z OGRANICZONA ODPOWIEDZIALNOSCIA, Wroclaw (PL)

( * ) Notice: Subject to any disclaimer, the term of this patent is extended or adjusted under 35 U.S.C. 154(b) by 407 days.

(21) Appl. No.: 18/093,690

(22) Filed: Jan. 5, 2023

(65) Prior Publication Data
US 2023/0148312 A1 May 11, 2023

Related U.S. Application Data

(63) Continuation of application No. PCT/IB2021/056013, filed on Jul. 5, 2021.

(51) Int. Cl.
*A61B 5/1455* (2006.01)
*A61B 5/145* (2006.01)

(52) U.S. Cl.
CPC ........ *A61B 5/14532* (2013.01); *A61B 5/1455* (2013.01); *A61B 2560/0214* (2013.01); *A61B 2562/0233* (2013.01)

(58) Field of Classification Search
CPC .............. A61B 5/1455; A61B 5/14551; A61B 5/14552; A61B 5/14532; A61B 5/6826;
(Continued)

(56) References Cited

U.S. PATENT DOCUMENTS

2006/0161055 A1* 7/2006 Pewzner .............. A61B 5/1455
600/310
2007/0027372 A1 2/2007 Hwang et al.
(Continued)

FOREIGN PATENT DOCUMENTS

| JP | 2012034828 | 2/2012 |
|---|---|---|
| WO | 1994013199 | 6/1994 |
| WO | 1997025915 | 7/1997 |

OTHER PUBLICATIONS

Visegrad Patent Institute as ISA, International Search Report and Written Opinion for Application No. PCT/IB2021/056013, Authorized Officer Pawel Koczorowski, Mailing date Nov. 18, 2021.

*Primary Examiner* — Chu Chuan Liu
(74) *Attorney, Agent, or Firm* — The Concept Law Group, PA; Scott D. Smiley; Scott M. Garrett

(57) ABSTRACT

The subject of the invention is a device for non-invasive blood glucose concentration measurement, comprising a central control system (4), a scattering module (1) and an electronic control system (2) of the scattering module (1) connected to it. The electronic control system (2) of the scattering module (1) is connected to the central control system (4). The scattering module (1) comprises a detection element (28) and a coherent radiation source (14) connected to the control system of the coherent radiation source (13). The device is characterized in that it further comprises a transmission module (7) and an electronic control system (8) of the transmission module (7) connected to it, connected to the central control system (4). The device further comprises a proximity sensor (12), connected to the central control (Continued)

system (4). The device comprises an optical fiber probe (11) comprising an emitting optical fiber (15) and a measuring optical fiber (18). The emitting optical fiber (15) is connected to a coherent radiation source (14). The measuring optical fiber (18) is connected to a detection element (28). The emitting optical fiber (15) and the measuring optical fiber (18) are parallel to each other within the optical fiber probe (11). The emitting optical fiber (15) and the measuring optical fiber (18) have a numerical aperture larger or equal to 0.5.

13 Claims, 9 Drawing Sheets

(58) Field of Classification Search
CPC ................ A61B 5/0075; A61B 5/0205; A61B 2562/0233; A61B 2562/146
See application file for complete search history.

(56) References Cited

U.S. PATENT DOCUMENTS

| | | |
|---|---|---|
| 2015/0305658 A1 | 10/2015 | Islam |
| 2018/0249911 A1* | 9/2018 | Hosoda ................ A61B 5/6826 |
| 2019/0008432 A1 | 1/2019 | Bashan et al. |
| 2021/0113121 A1* | 4/2021 | Diab .................. A61B 5/14532 |

\* cited by examiner

DEVICE FOR NON-INVASIVE BLOOD GLUCOSE CONCENTRATION MEASUREMENT

CROSS-REFERENCE TO RELATED APPLICATION

This application is a bypass continuation of PCT/IB2021/056013, filed Jul. 5, 2021 and which claimed priority to Polish App. No. PL434575, filed Jul. 6, 2020, the entireties of which are hereby incorporated by reference.

TECHNICAL FIELD

The subject of the invention is a device for a non-invasive measurement of glucose concentration in blood. The device finds its application in medical diagnostics.

BACKGROUND

Non-invasive glucose measurement is an important issue which impacts the life comfort of patients suffering from diabetes.

Currently blood sugar level measurements using commercially available glucometers are performed primarily by means of invasive tests, requiring taking a blood sample. Daily, multiple punctures are uncomfortable and bothersome. Also, it is not without significance that the results are discontinuous (information on concentration is read only at the time of measurement). Also the availability of tests in developing countries is limited due to the relatively high price of strips for chemical measurement by traditional method. Therefore, in recent years new, simple, inexpensive, and non-invasive methods of measuring blood glucose concentration are sought.

Most of the commercially available glucometers require direct contact with blood or other human body fluids. Therefore, it is necessary to break the skin continuity, either by a needle puncture in the case of classic strip glucometers, or by inserting a needle in so called semi-invasive sensors.

Non-invasive blood glucose level measurement can be performed using multiple methods, including: optical (Ewa Hammer et. al., Lanthanide-based nanostructures for optical bioimaging: Small particles with large promise, MRS bulletin volume 39, November 2014) or thermoconductivity (Ulrika Harborn, Evaluation of a miniaturized thermal biosensor for the determination of glucose in whole blood, Clinica Chimica Acta Volume 267, Issue 2, 28 Nov. 1997, Pages 225-237). In optical methods, the measurement of glucose is performed using transmission or scattering techniques.

Transmission methods usually utilize spectrophotometry in the spectral range of near-infrared (NIR; $\lambda < 2$ μm) or mid-infrared (MIR; $2$ μm$<\lambda<10$ μm). As light sources semiconductor diodes and fluorescent sources are used. Transmission methods are based on the characteristics of light absorption by glucose in the NIR and MIR spectral range.

Due to the local minimum of the absorption in the NIR spectral range, a skin or tissue transmission test using a single excitation wavelength, e.g. 850, 920 nm is often used. Solutions operating in the NIR spectral range are significantly more often covered in literature due to the lower price of components. Due to high prices of radiation sources and detectors, and the necessity of their active cooling, they are seldom used.

The glucose level testing method using Raman scattering is based on the measurement of the inelastic scattering of photons by the tested substance. Inelastically scattered photons have a wavelength greater or smaller than the wavelength of the light exciting the sample. The measurement is conducted in the range of waves other than the excitation wave.

Scattering methods (Raman methods), make it possible to characterize the chemical composition of a substance. They also provide information on the crystallinity, polymorphism, or changes in pressure and temperature. A significant limitation of Raman spectrophotometry is the high ratio of the amount of photons of pumping light to the amount of inelastically scattered photons. The pumping light is usually over a million times more intense. For that reason, the use of Raman methods requires development of device constructions, in which the effective measurement of inelastically scattered photons, which are not available in large amount, is provided. In particular, for this purpose it is necessary to construct probes in which the ability to direct the largest possible amount of photons to the detection system is provided.

In scattering methods, in the context of glucose tests, primarily infrared lasers as light sources are used, due to their price and the applicable biological window of the skin—near-infrared light is little absorbed by the skin. The measuring signal is then transmitted to a spectrometer, where it is subjected to separation according to wavelength. For the detection of Raman radiation a spectrophotometer is used.

In the European patent EP2753918B1 an optical glucose sensor is described, in which an optical fiber covered by a barrier selectively permeable to glucose particles is disclosed. A sensor of this type must be placed transdermally. The phenomenon is based on the FRET technique (Förster Resonance Energy Transfer), thus, it requires a very small distance of the analyt particle to the fluorescent pigment. The frequency of radiation modulation depends on the excited time, it was determined at 50-60 MHz. The light originating from the LED diode is filtered, it falls onto a light splitting plate, and then filtered again using filters, and focused with lenses on the sensor. Fluorescent light, along with the reflected excitation light, is received and collimated using a lens, then the light splitting plate passes only the light originating from fluorescence, which is focused by a lens on the photodetector. A modified method using an epifluorescence microscope is also described.

An important parameter of the optical fiber is a so called numerical aperture (NA) which constitutes a product of the sine of the acceptance angle and the refractive index of the medium. The numerical aperture value determines the range of light incidence angles enabling the propagation of light in the optical fiber. The limit of that range is determined by the acceptance angle.

Examples of optical fibers with a high numerical aperture are plastic optical fibers, also called polymer optical fibers. Among polymer optical fibers are known: Poly(methyl methacrylate) optical fibers, further PMMA, and Polystyrene optical fibers, further PS. In polymer optical fibers, the cladding of the optical fiber is often made of silicone resins. In the state of the art, e.g. in the publication "Step-Index PMMA Fibers and Their Applications" Silvio Abrate et al., 2012 (DOI: 10.5772/52746) also other known polymer optical fibers are known, e.g. in which the core is made from an amorphous fluorinated polymer CYTOP, and the cladding from PMMA.

Glucose measuring devices known in the state of the art utilize glass optical fibers, which is a natural choice due to the availability of spectrometric devices cooperating with glass optical fibers and the fact that such optical fibers are characterized by significantly lower losses (attenuation) compared to, e.g. plastic optical fibers, also called polymer optical fibers. Plastic optical fibers have higher attenuation than glass optical fibers, which has a negative impact on their application in optical fiber sensors.

Glass optical fibers, however, are characterized by brittleness and perform well primarily in laboratory conditions; they do not work when applied to measurements a patient's glucose in household conditions. This inconvenience is exacerbated by the fact that in order to achieve the appropriate amount of light necessary to detect scattered radiation, a bundle of glass optical fibers is required; single glass optical fibers have an insufficient numerical aperture for that purpose. Therefore, the construction of a probe based on a bundle of optical fibers with a small numerical aperture is complicated.

Glass optical fibers, typically have a small numerical aperture, usually approx. 0.22 (angle of acceptance of 12.7 degrees). Due to the angle of acceptance, multi-fiber optical fiber probes are used—usually six-fiber. In such a configuration, the receiving (detecting) optical fiber is surrounded by the other optical fibers in order to increase the illuminated volume and amount of returning light. Such a solution complicates the construction of the optical fiber device/probe.

In the American patent application US20190150806A1 there is a description of a blood glucose measurement device. It is an invasive device consisting of an actuator controlling the flow of liquid, a surface of microneedles at a distance of 200 micrometers from each other, length of 400 to 900 micrometers, and diameter of 10 to 550 micrometers, a sensor, and a controlling chip. In the system a liquid canal, a pressure chamber, and a liquid storage chamber were used. The system is attached directly to the wrist, and can be connected wirelessly or using a USB connection.

In the international patent application WO02087429A1 a device for measuring glucose concentration from a human eye is disclosed. The eye is illuminated outside of a cornea in order to excite the eyepiece glucose sensor in contact with the eye liquid. The sensor is capable of emitting two bands of fluorescence, both beams travel through the optical system (the system measures at two wavelengths simultaneously). The glucose concentration is calculated based on the ratio of the luminescent band intensity, afterwards, the amount of glucose in the eye liquid is calculated to blood glucose concentration using an algorithm. The method utilizes fluorescent markers which constitute internal standards. The sensor consists of an ophthalmic lens which contains a marker (receptor) of glucose competing with the second fluorescent marker. These can be: fluorescein, indocyanine green, malachite green, rhodamine. The ophthalmic lens (single or multiple use) may be movable (similar to a contact lens), or implanted permanently.

In the American patent U.S. Ser. No. 10/433,775B2 a non-invasive in vivo glucose sensor using Raman spectroscopy directly from the skin (penetration depth 200-300 micrometers) is described. The device requires calibration for different people. It also allows to measure the content of fatty acids, cholesterol, urea, and hemoglobin. The device comprises an emitter (a diode laser 300-1500 nm, preferred lines are 785, 830, or 850 nm), beam directing elements (lenses), and a detection system. The system comprises a dichroic mirror (45 degrees to the propagation vector). In certain applications there is a window between the skin and the lens allowing for variable beam penetration depth.

In the international patent application WO2017014981A1 a system and a method of glucose level monitoring is described. The glucose biosensor comprises multiple optical fibers to be inserted into the ear canal. The first optical fiber emits light into the canal, the others capture and transmit the reflected light using photodetectors (photodetector). In the first application UV light is used (from 300 to 400 nm), the biosensor is able to wirelessly transmit the data. In the device Raman spectroscopy, NIR, fluorescence, thermal emission, photoacoustic, and polarimetry techniques may be used. The IR radiation source may also be a LED diode. The biosensor may be installed on the frames of glasses. It comprises a battery. When used with Raman spectroscopy, a LED diode is used.

In the American patent U.S. Ser. No. 10/441,201B2 a non-invasive glucose sensor for in vivo tests using infrared radiation in the MIR spectral range is disclosed. The sensor is used in contact with the skin. The system consists of a mid infrared source (e.g. a quantum cascade laser), and a system for receiving and detecting backscattered radiation. In the sensor optical fibers can be used, and the receiving system may constitute an integrating sphere or a package of optical fibers.

In the international patent application WO03023356A2 a portable, non-invasive in vivo glucose sensor is disclosed. The device consists of a spectrometer, a light source (a fluorescent lamp, UV, VIS, IR or their combinations in a wavelength spectral range from 200 nm to 2500 nm), an optical interface which enables transmission of a light beam, a detector (photodiode, CCD). The measurement of scattered reflected light in the UV, VIS, IR, and Raman spectral range, and their combinations is possible to be performed. The UV source may be a mercury lamp, xenon lamp, or laser (nitrogen, Nd:YAG, dual optical parametric oscillator). Impulse (femtosecond) sources consist of a 2-channel lock-in amplifier. A measurement from the skin on the arm, leg, neck, head, torso, or their combinations is claimed. The system includes an optically transparent tape, divided into zones: calibration, measurement, and for storing and protecting the system. The device may be powered by a battery. The device weighs less than 1 kg.

The objective of the invention is to solve the problem of providing a blood glucose concentration measurement device which enables non-invasive measurements without a need to use a complex optical system, or additional pigments, e.g. fluorescent, operating in a radiation spectral range which is safe to humans, and ensuring an objective measurement, the result of which would be independent of the body's condition or individual characteristics.

Additionally, the objective of the invention was to provide a device useful to patients with type 1 diabetes, in which it is possible to perform both quick measurements, ensuring information on the trend of blood glucose concentration changes, as well as precise measurements providing an exact glucose concentration value. Due to the fact that the invention enables quick indication of glucose concentration change trends, it is possible to use it for patients whose reaction to glucose concentration changes within a time below 5 minutes, and preferably within 2-3 minutes, is critical to health and life.

SUMMARY

A non-invasive glucose concentration measurement device according to the invention comprises a central control system, a scattering module, and an electronic control system of the scattering module connected to it. The electronic control system of scattering module is connected to the central control system. The scattering module comprises a detection element and a source of coherent radiation connected to a control system of coherent radiation source. The scattering module enables detection of characteristic Raman peaks originating from glucose. The glucose concentration value is calculated using the scattering module.

The non-invasive glucose concentration measurement device according to the invention further comprises a transmission module and an electronic control system of the transmission module connected to it, connected to the central control system.

The transmission module further comprises a distal infrared radiation emitter, and a proximal infrared radiation emitter, and an infrared radiation detector. In the present description, the proximal infrared radiation emitter is the emitter located closer to the infrared radiation detector, and the distal infrared radiation emitter is the emitter located further from the infrared radiation detector in relation to the proximal radiation emitter.

Use of the transmission module enables quick measurement of the trend of glucose concentration change, which is particularly significant for patients for whom glucose concentration changes are very sudden.

The simultaneous application of the scattering module and the transmission module provides a synergistic effect which is based on the fact that by means of one device, a patient is able to conduct the glucose concentration measurements (using the scattering module), as well as measurements of trends of glucose concentration change, which is necessary in sudden conditions related to hypoglycemia and hyperglycemia. The measurement of the trend of glucose concentration change (whether the glucose concentration increases or decreases) allows for quick reaction. The requirement of measurement which is both quick and precise is difficult to meet using just one sensor, however, thanks to using both the scattering module and the transmission module, the device according to the invention enables both precise, although rather slow measurement of blood glucose level using the scattering module, as well as quick observation of the trend of change using the transmission module, providing a set of information relevant to patients with type 1 diabetes.

The non-invasive glucose concentration measurement device further comprises a proximity sensor connected to the central control system. Thanks to the use of the proximity sensor it is possible to determine whether the patient's skin is in the appropriate location in relation to the optical fiber probe and the transmission module.

The non-invasive glucose concentration measurement device comprises an optical fiber probe comprising an emitting optical fiber and a measuring optical fiber, wherein the emitting optical fiber is connected to the coherent radiation source, and the measuring optical fiber is connected to the detection element. The emitting optical fiber and measuring optical fiber are parallel to each other in the area of the optical fiber probe, wherein the emitting optical fiber and measuring optical fiber have a numerical aperture of 0.5 or higher. Such value of numerical aperture ensures the appropriate amount of light supplied to the scattering module and the device allows for measurement using only two optical fibers—the emitting optical fiber and the measuring optical fiber.

Advantageously, the distal infrared radiation emitter and the proximal infrared radiation emitter constitute semiconductor diodes.

Advantageously, the distal infrared radiation emitter and the proximal infrared radiation emitter comprise semiconductor diodes with an equal emission wavelength.

Advantageously, the semiconductor diodes emitting infrared radiation are selected from a group comprising diodes with the emission wavelength of: 850 nm, 940 nm, or 1300 nm. These wavelengths are similar to the characteristic minimums of glucose absorption within the spectral range of infrared light. What is more, there are low cost emitters available for the indicated wavelengths, which makes the system less expensive and more available to patients.

Advantageously, the device according to the invention has a power supply stabilization system, which provides power to the control system of the scattering module, to the control system of the transmission module and to the proximity sensor. The application of such power supply stabilization system results in reduced noise, tenting, and elimination of power supply oscillation. Whereas, separation of the control systems leads to a lack of common ground, and an increased signal to noise ratio, which influences measurement accuracy.

Advantageously, a touchscreen is connected to the central control system. The touchscreen ensures comfort and ease of device operation.

Advantageously, a wireless transmission module is connected to the central control system. Advantageously, the wireless transmission module constitutes a Wi-Fi or Bluetooth module. The wireless transmission modules enable connection with the data cloud or smartphone type devices. This makes it possible to transmit measurement results and, e.g. their further transfer for analysis to, for example, a medical center.

Advantageously, the optical fiber probe for measuring the scattered radiation additionally comprises an assembly sleeve in which the emitting optical fiber and the measuring optical fiber are mounted by means of a glue.

In an advantageous embodiment of the invention, the emitting optical fiber and measuring optical fiber are polymer optical fibers. Wherein, advantageously, when the cladding diameter of the emitting optical fiber and the measuring optical fiber is 1 mm. Such cladding diameter enables easy installation of the optical fiber in the optical fiber probe and, simultaneously, it limits the risk of damaging the probe.

Advantageously, the device according to the invention additionally comprises a reference module comprising a reference substance. The reference module makes it possible to obtain additional, characteristic peaks. The additional characteristic peaks originating from the reference module enable automatic calibration of the device.

Advantageously, the reference module is located in the optical path of the emitting optical fiber.

Advantageously, the reference module constitutes an overlay on the optical fiber probe.

By ensuring the device according to the invention, the scattering measurements, in particular using Raman radiation detection, are possible using a probe containing only two optical fibers, each with a numerical aperture of at least 0.5 (equal 0.5 or higher), in particular, so called plastic optical fibers. Although plastic optical fibers have greater attenuation compared to glass optical fibers, this fact does not impact the efficiency of measurement performance in the construction of the device according to the invention.

A solution according to the invention is characterized by a range of advantages. The device according to the invention enables the non-invasive measurement of blood glucose concentration. Additionally, to its operation the use of consumable materials such as, e.g. glucometer strips are not required, which results in a reduction of amount of medical waste. It is also relevant, that by means of such device it is possible to perform the measurements in a continuous way.

The device according to the invention also does not require multiple calibrations. An equally important advantage of the device is that performance of measurements is not dependent on background levels, i.e. the body's condition or individual characteristics, while the measurements are characterized by high accuracy.

The device is also able to operate in a telemedical system. The wireless connectivity module in the Bluetooth or Wi-Fi standard was used in the device. After connecting to a Wi-Fi network or a smartphone, information on the measured glucose level may be recorded in the device's memory or in the cloud, and then transferred to, e.g. an attending physician who, having remote access to the results, is able to issue further recommendations concerning treatment. The applied construction elements result in the manufacturing cost of the device being lower compared to solutions with similar properties and functionalities.

BRIEF DESCRIPTION OF THE DRAWINGS

Non-limiting embodiments of the invention are shown in the figures, where.

DETAILED DESCRIPTION OF THE EMBODIMENTS

Example 1

Figure 1:
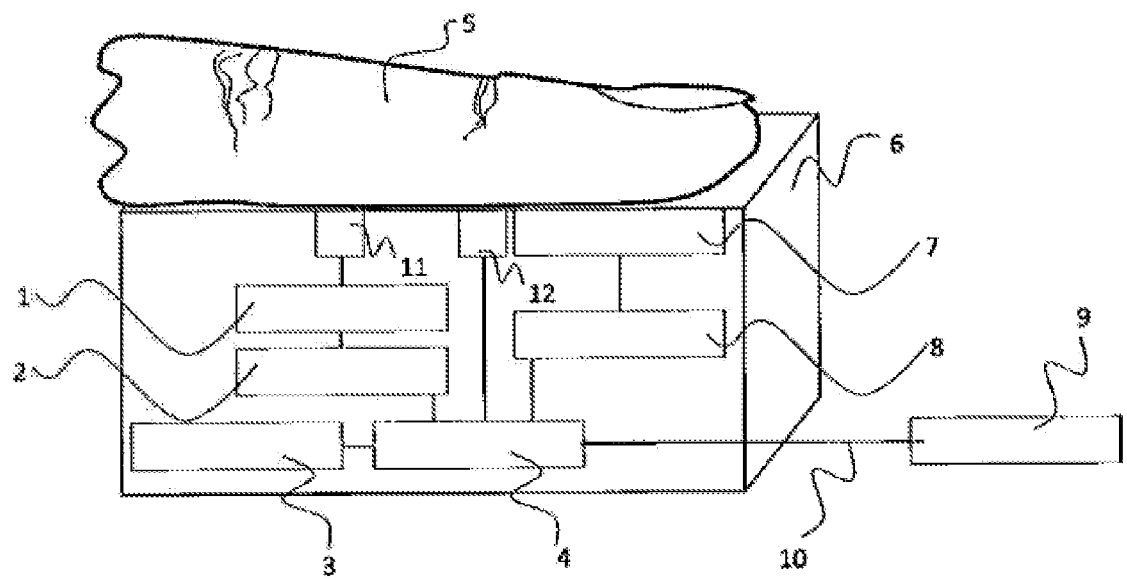
FIG. 1 shows a scheme of the device according to the invention according to one of the advantageous embodiments.
Figure 2:
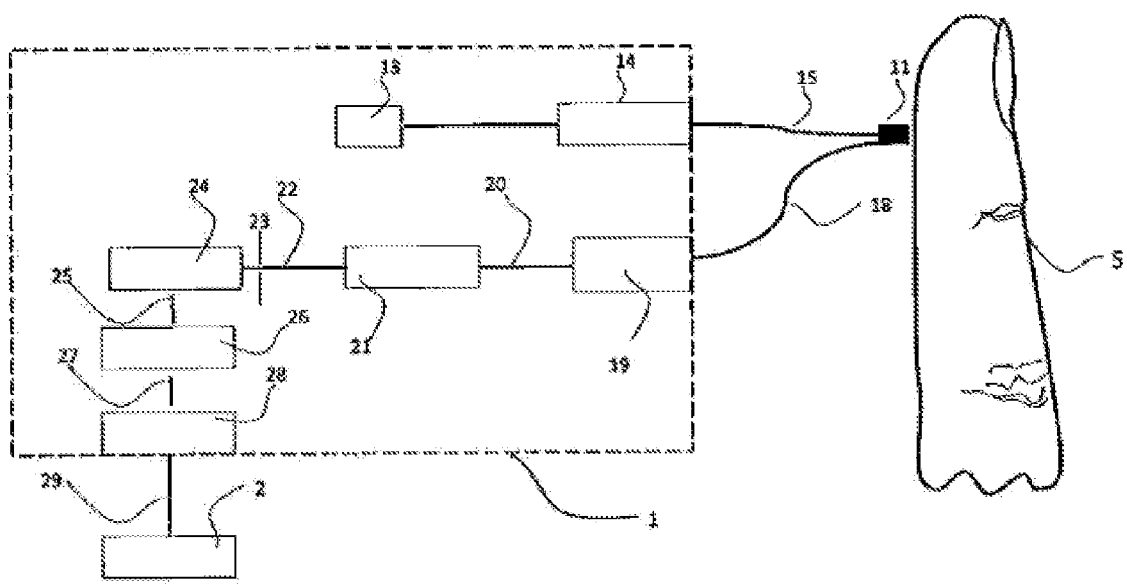
FIG. 2 shows a more detailed scheme of the scattering module from FIG. 1.
Figure 3:
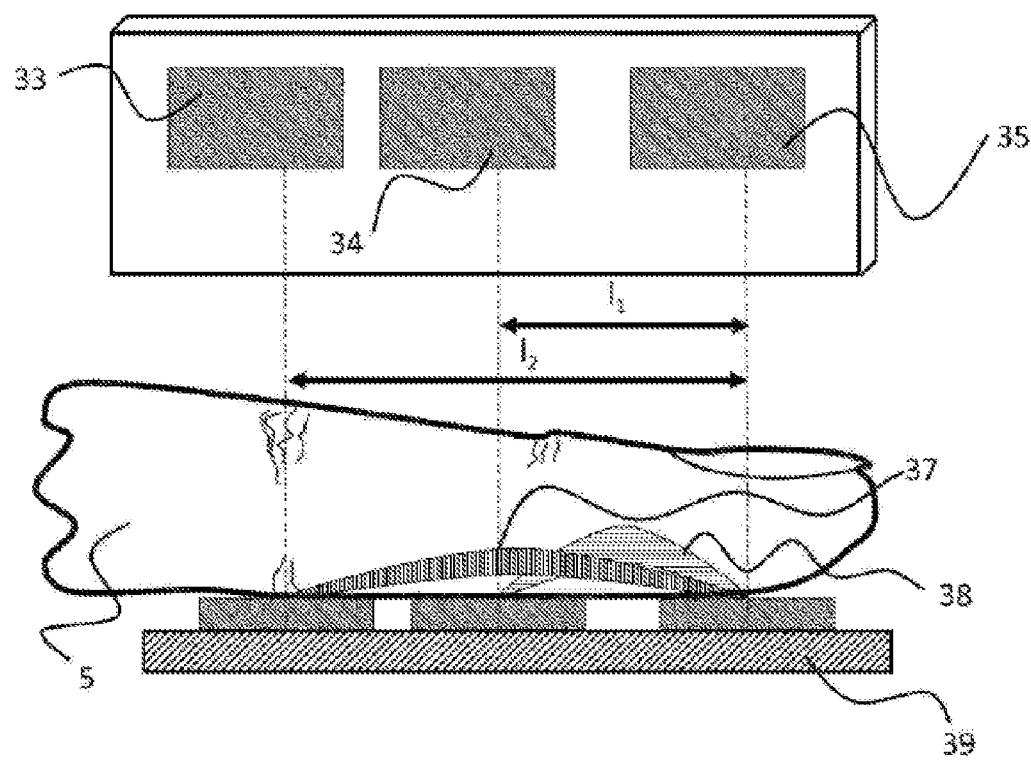
FIG. 3 shows a view of the transmission module and its placement in relation to the patient.

A device for non-invasive blood glucose concentration measurement, the scheme of which is presented in FIG. 1, comprises a scattering module 1 and transmission module 7. FIG. 2 further presents a more detailed view of the scattering module 1, while FIG. 3 shows a more detailed view of the transmission module 7.

The scattering module 1 is controlled by the control system 2 of the scattering module. The control system 2 of the scattering module 1 is connected to the central control system 4 of the device. The central control system 4 is connected to the power supply system 3. A person skilled in the art routinely selects the power supply system 3, as well as he selects routinely the means for realizing the connection of the central control system 4 to the control system 2 of the scattering module 1.

The scattering module 1 in this embodiment allows for measurement of Raman scattering. The scattering module is realized in a Raman spectrophotometer system.

The scattering module 1 comprises a coherent source 14, in this embodiment a laser diode with a wavelength of 785 nm.

The coherent source 14 is controlled through connection to the control system of the coherent radiation source 13.

An exemplary realization of the Raman scattering in the scattering module is described below.

The scattering module in this embodiment further comprises a radiation collimator optical system 19, which is connected to the measuring optical fiber 18. A collimated beam of light 20 exits the radiation collimator optical system 19, and is then directed to a high-pass filter 21. The beam of light 22, after passing through the high-pass filter 21 is then directed to a diffractive slit 23. After passing through the diffractive slit 23, the beam reaches a dispersion module 24, where it is split. The dispersion module 24 in this embodiment is realized by a diffraction grating with 1200 grooves/mm. The split beam of light 25 is further directed to a focusing lens 26. After passing through the focusing lens 26, the focused beam of light 27 is directed to the detection element 28. Such realization of the scattering module is one of the example embodiments of connection of the measuring optical fiber 18 with the detection element 28.

The coherent source 14 and the detection element 28 (light-sensitive) may be additionally equipped with an active temperature stabilization system with the use of Peltier modules (not shown in the figure).

It is worth highlighting, that the basis of the operation of the invention is provided by the scattering module 1 comprising the coherent source 14 with the control system of the coherent radiation source 13, and the detection element 28. A person skilled in the art is able to select the means for realizing the Raman scattering in the scattering module 1 or use available commercially devices for this purpose.

In this embodiment, the detection element 28 is realized via a CCD (charge-coupled device) matrix. In particular, this can also be a line of CCD cameras. The measuring signal 29 from the detection element 28 is directed to the control system of the scattering module 2. The control system of the scattering module 2 comprises, in particular, an analog-digital converter.

The optical signal registered by the detection element 28 is processed by the control system 2 of the scattering module 1 and transmitted to the computer 9 via the control system 2 of the scattering module 1, and the control system 4 of the non-invasive glucose measurement device. The connection between the central control system 4 and the computer 9 may be achieved via a USB connection 10 or in any other method of electronic communication. A person skilled in the art routinely selects both the connection between the central control system 4 and the computer 9, as well as the computer 9 itself. The USB connection 10 and the computer 9 in FIG. 1 are placed for illustrative purposes and they are not part of the device according to the invention.

Figure 6:
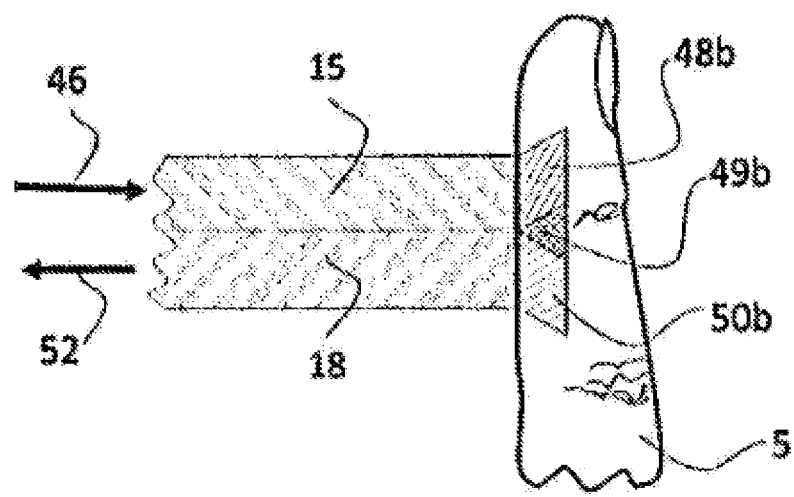
FIG. 6 shows an illustrative view of the application of the optical fiber probe to the patient (figure not to scale)

The wavelength of the coherent source has been chosen in terms of human skin minimum absorption values. A measuring window of 800-1350 nm is used, in which observation of Raman peaks originating from the tested substance occurs. The excitation signal 46 and the measuring signal 52 (Raman response) are transmitted by means of the optical fiber probe 11 (FIG. 6).

The obtained characteristics also comprise information concerning other compounds contained in the skin, which requires filtering in order to distinguish the signal originating from the glucose from the unusable signal. After the filtering process, the signal is then subjected to further analysis.

The central control system 4 is connected to a proximity sensor 12. By means of the proximity sensor 12 an information is obtained, whether the hand of the patient 5 has been placed on the device. A person skilled in the art will routinely select an appropriate proximity sensor for that purpose. The activation of the device may be realized by means of proximity sensor 12.

The device according to the invention further comprises an optical fiber probe 11. The optical fiber probe 11 comprises an emitting optical fiber 15 and a measuring optical fiber 18. The emitting optical fiber 15 is connected to the coherent radiation source 14. The measuring optical fiber 18 is connected to the detection element 28, in particular via the radiation collimator optical system 19.

The emitting optical fiber 15 and the measuring optical fiber 18 have a numerical aperture equal to at least 0.5. The numerical aperture is defined in accordance with literature, e.g. publication Udd, E., & Spillman Jr, W. B. (Eds.). (2011). Fiber optic sensors: an introduction for engineers and scientists (John Wiley & Sons). The numerical aperture for the optical fiber is the sine of the cone of acceptance angle, i.e. the largest angle from the optical axis (leading along the center of the core) at which the radiation entering the fiber can be further propagated (from the perspective of geometrical optics, maintaining the limit angle of the total internal reflection), multiplied by the refractive index of the medium. Analogously, the radiation exiting the optical fiber creates an output cone with an angle equal to the angle of acceptance.

In this embodiment, the emitting optical fiber is a PMMA optical fiber with a diameter of 1 mm and numerical aperture of 0.5.

Figure 4:
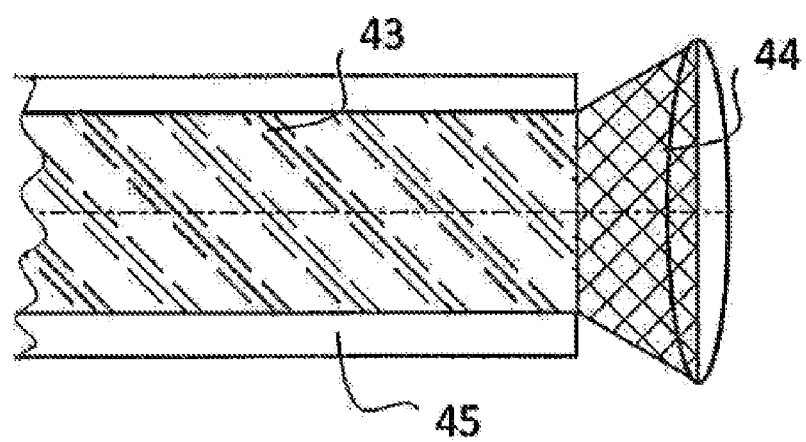
FIG. 4 shows an illustrative view of the cone of acceptance for an optical fiber with a numerical aperture of approx. 0.5.

FIG. 4 schematically shows a PMMA optical fiber with a PMMA optical fiber core 43 and a PMMA optical fiber cladding 45. The PMMA optical fiber core 43 in this embodiment has a diameter of 960 µm. The PMMA optical fiber cladding 45 in this embodiment has a diameter of 1000 µm. FIG. 4 further schematically presents the cone of acceptance 44 of the PMMA optical fiber.

Figure 5:
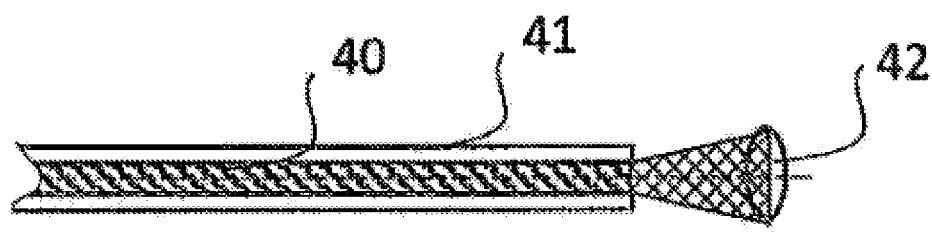
FIG. 5 shows an illustrative view of the cone of acceptance for a silica optical fiber.

For comparison, FIG. 5 schematically presents a classic silica optical fiber with a silica optical fiber core 40 (diameter of 62.5 µm) and a silica optical fiber cladding 41 (diameter of 125 µm). The silica optical fibers with a core diameter of 62.5 µm and 125 µm used as a standard have low numerical apertures (NA=0.22), thus, a smaller angle of acceptance<30°, which in turn results in a low measuring signal amount.

The objective of the invention was to, among others, simplify the construction of optical fiber probes. This objective has been reached by using two optical fibers—the emitting optical fiber 15 and the measuring optical fiber 18, with a numerical aperture equal to at least 0.5.

The increased numerical aperture allows to minimize losses in the optical fiber and obtain the highest possible amount of light exiting the emitting optical fiber 15 and entering the measuring optical fiber 18.

FIG. 6 additionally shows (as a reference and not to scale) the emitting optical fiber 15, to which the excitation signal 46 is directed, and the measuring optical fiber 18, which directs the measuring signal 52. In FIG. 6 also a reference cone of acceptance 48b of the emitting optical fiber 15 (PMMA in this embodiment) is marked, and the cone of acceptance 50b for the measuring optical fiber 18 (PMMA in this embodiment); because in the figure both the cone of acceptance 48b of the emitting optical fiber 15 and cone of acceptance 50b for the measuring optical fiber 18 is marked, the shared area for both cones 49b is hatched. FIG. 6 also schematically shows the placement of the emitting optical fiber 15 and the measuring optical fiber 18 in relation to the finger of the patient 5 (not to scale).

Figure 8:
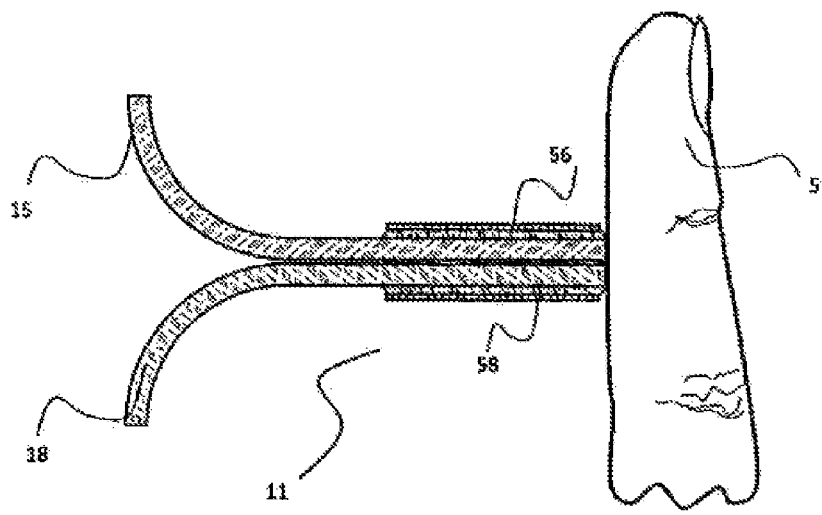
FIG. 8 shows a schematic view of the optical fiber probe, in which the placement of the optical fibers in the assembly sleeve is visible, and the orientation of the optical fiber probe in relation to the patient's finger during measurement is visible.

The emitting optical fiber 15 and the measuring optical fiber 18 are placed parallel inside the optical fiber probe 11, which is shown in FIG. 8. Such parallel placement of the emitting optical fiber 15 and the measuring optical fiber 18 makes it possible to receive a greater measuring signal amount. FIG. 8 shows a placement of the emitting optical fiber 15 and the measuring optical fiber 18, whose ends are parallel along the section which is in direct contact with the patient 5. The emitting optical fiber 15 and the measuring optical fiber 18, whose ends are placed in the assembly sleeve 58, are joined to each other and with the assembly sleeve 58 by means of assembly glue 56, epoxy glue in this embodiment.

The transmission module 7, presented in FIG. 3, comprises an infrared radiation detector 35, in this embodiment in the form of a semiconductor Si (silicon) photodiode.

The transmission module further comprises a proximal infrared radiation emitter 34 and a distal infrared radiation emitter 33. Advantageously, the emitters in this embodiment are semiconductor LED diodes based on Si or GaAs (gallium arsenide), of equal wavelength selected from the group of 850 nm, 940 nm, 1300 nm. In this embodiment diodes with an 850 nm wavelength used. Both the proximal infrared radiation emitter 34 and the distal infrared radiation emitter 33 emit the same wavelength.

To a person skilled in the art it is obvious that it is also possible to use emitters based on other semiconductors. Of course, for the correct operation of the invention it is necessary to select compatible infrared radiation emitters 33, 34 and the infrared radiation detector 35, so that, the detector enables to measure the emitted wavelength.

Wavelengths of 940 nm and 1300 nm performed equally well. AlGaAs (gallium-aluminum arsenide) and InGaAs diodes performed equally well. A person skilled in the art will routinely select the emitter-detector pair.

The proximal infrared radiation emitter 34, the distal infrared radiation emitter 33, and the infrared radiation detector 35 are located on the PCB board 39 (Printed Circuit Board). A person skilled in the art will routinely select alternative placement methods of such elements. The PCB board 39 is connected to the control module of the transmission module 7 (connection not shown in the figures).

Information concerning the transmission value is determined by a differential measurement of the signal originating from the distal infrared radiation emitter 33 and the proximal infrared radiation emitter 34 located at two different distances from the infrared radiation detector 35. FIG. 3 schematically presents a light wave 37 propagating between the distal infrared radiation emitter 33 and the infrared radiation detector 35, and the light wave 38 propagating between the proximal infrared radiation emitter 34 and the infrared radiation detector 35.

In the measurement using the transmission module the transmission by means of the distal infrared radiation emitter 33 is measured first, and after the measurement, a transmission measurement is performed by means of the proximal infrared radiation emitter 34.

The transmission measurement is conducted directly, i.e. by direct application of the transmission module 7 to the tested area, e.g. the finger or the hand of the patient 5.

The transmission module 7 is used for measuring the trends in change of glucose concentration in the body, i.e. to measure, whether the glucose concentration value increases or decreases. Such trend measurement is particularly significant for patients suffering from hypoglycemia or hyperglycemia, or those who expect abrupt changes in glucose concentration due to consumed food or medications.

In the transmission module a measurement of the transmission signal value is performed. In the first place, the measurement of the transmission signal $S_{\lambda d}$ is performed for the wavelength $\lambda_n$ (selected from the group of $\lambda_n=\{850, 940, 1300\}$ [nm]), using the distal infrared radiation emitter 33 and an infrared radiation detector 35, afterwards, the same measurement of the transmission signal $S_{\lambda p}$ is performed using the proximal infrared radiation emitter 34 and the infrared radiation detector 35.

Afterwards, the differential transmission value is determined for the specified wavelength $S_{\lambda n}$ by determining the transmission value ratio for the proximal emitter $S_{\lambda p}$ and the transmission value calculated for the distal emitter $S_{\lambda d}$; which is determined by the formula:

$$S_n = \frac{S_p}{S_d}$$

The differential transmission value for the specified wavelength $\lambda_n$ changes with the changing glucose concentration in the patient's body. Determination of differential transmission changes allows to determine the trend of glucose concentration changes in the body and provide the patient with preliminary information whether the glucose concentration value is rising (rising trend) or falling (falling trend).

Figure 7:
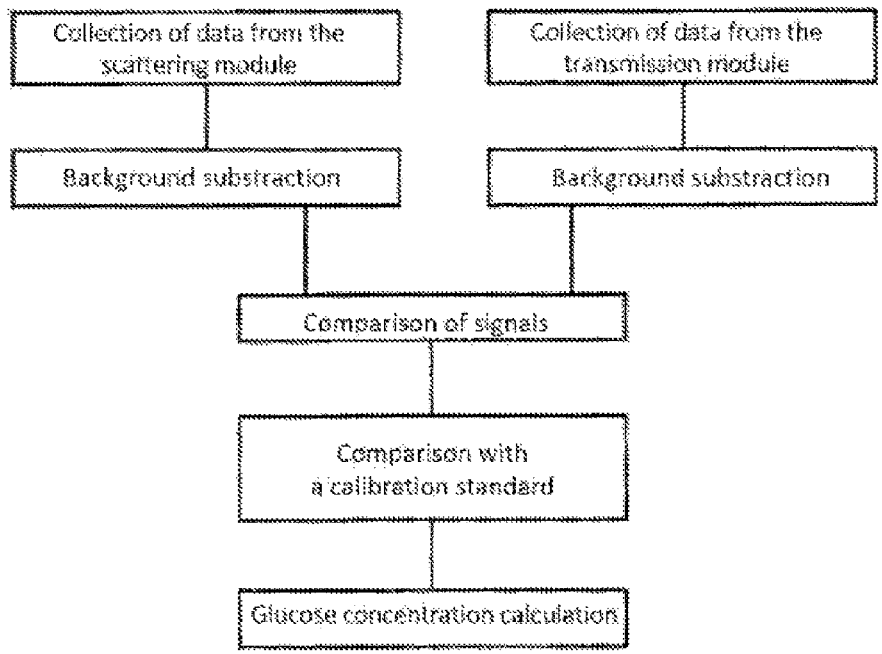
FIG. 7 shows a scheme of measurement which is performed using the device according to the invention.

Thanks to the simultaneous use of the scattering module 1 and transmission module 7 it is both possible to provide the accurate glucose concentration measurement (using the scattering module 1), and the trend of glucose concentration change (using the transmission module 7). The measurement of the trend of glucose concentration change using the transmission module 7 is significantly faster than using the scattering module 1. A device comprising both a scattering module 1 and a transmission module 7 may have both modules run—the scattering module 1 and transmission module 7—simultaneously or each separately, depending on the needs and patient's condition. FIG. 7 presents an example measurement schematic which uses the scattering module 1 and transmission module 7 simultaneously.

The signal from the infrared radiation detector 35 of the transmission module 7 is directed to the control system of the transmission module 8, in this embodiment via the PCB assembly board 39.

The signal of the control system of the transmission module 8 is directed to the central control system 4.

In the central control system 4 of the non-invasive glucose concentration measurement device, the skin absorption difference for the proximal infrared radiation emitter 34 and the distal infrared radiation emitter 33 is determined, at different distances, l1 and l2 respectively, from the infrared radiation detector 35, and afterwards, the transmission through the examined patient's skin is determined.

The length l1 in this embodiment is 5 mm, and the length l2 in this embodiment is 10 mm. The length l1 performed equally well in the range from 4 mm to 9 mm, and the length l2 performs equally well in a range from 9 mm to 12 mm, wherein the condition of l2>l1 must be fulfilled.

The central control system 4 of the non-invasive glucose concentration measurement device in this embodiment comprises an analog-digital converter, a system of amplifiers, a power supply system, and a communication rail.

The central control system 4, the control system 2 of the scattering module 1, and the control system 8 of the transmission module 7 may be realized, e.g. using microcontrollers, e.g. STM32 Nucleo-F103RB, although a person skilled in the art will routinely select other elements which fulfill control functions.

An example measurement procedure using the non-invasive blood glucose concentration measurement device comprises the following stages. The first stage is placement of the forearm/limb/tissue, on which the measurement is performed, on the device. By means of proximity sensor 12 it is checked whether the arm of the patient 5 has been placed on the device. The following step is commencement of the measurement and the simultaneous acquisition of a signal from the scattering module 1, and signal from the transmission module 7. During the measurement, the tissue of the patient 5 is illuminated by the coherent radiation source 14 of the scattering module 1. The signal is also simultaneously collected by the transmission module 7.

An example measurement using both modules—the scattering module 1 and the transmission module 7—is as follows: the coherent radiation source via the emitting optical fiber 15 illuminates the tissue of the patient 5 for approx. 1 minute—during this time, one spectrometric spectrum is obtained, after which the source is switched off, the so called dark characteristic is collected (also for approx. 1 minute), and then the coherent source 14 is switched on once again (also for approx. 1 minute), and a spectrum is collected. Then the coherent source is switched off and the so called dark characteristics is collected (for approx. 1 minute). Such a scattering spectrum measurement lasts approx. 4 minutes.

Figure 10:
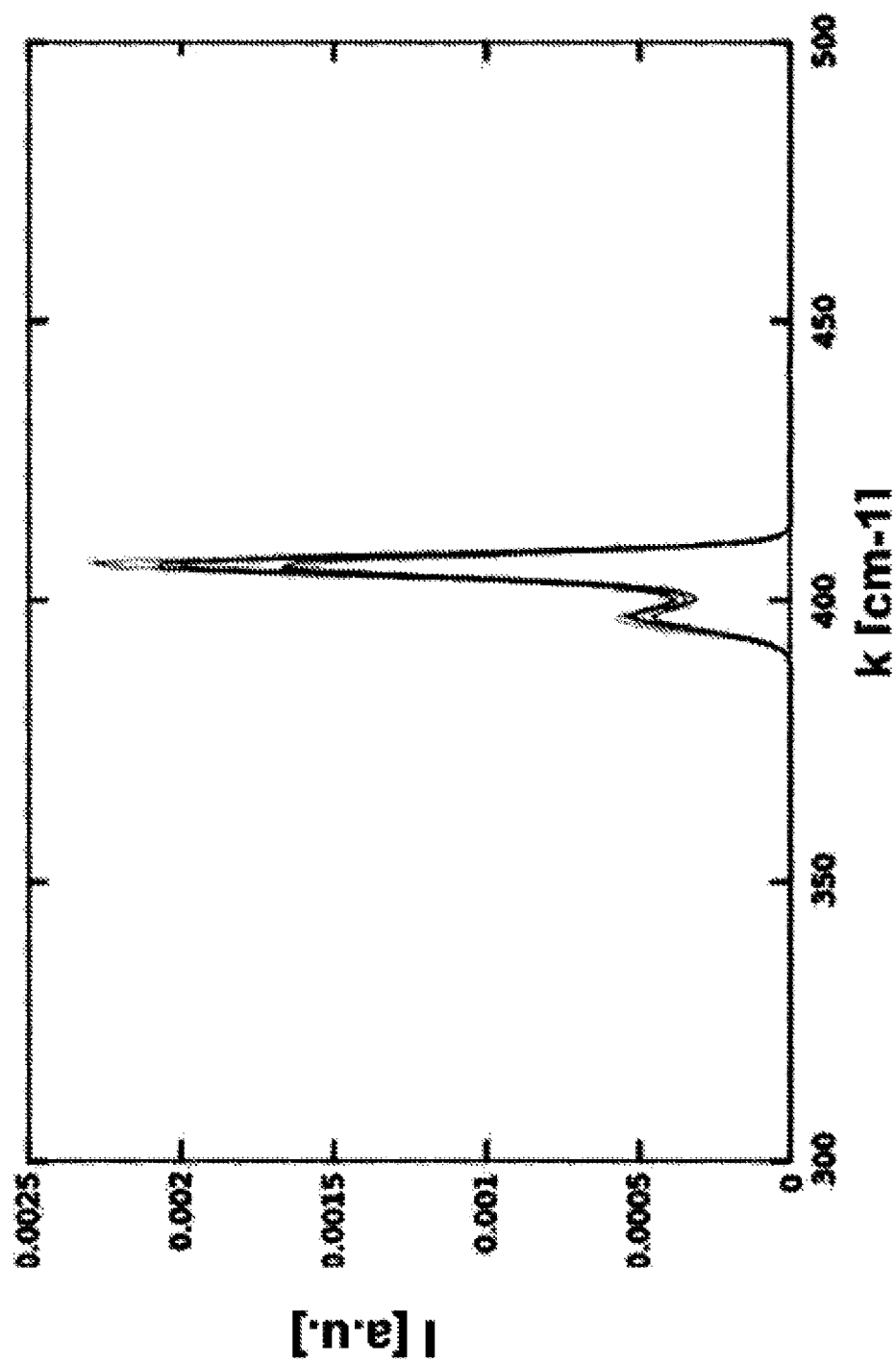
FIG. 10 presents normalized Raman blood glucose spectra, multiplied by the modified reference crystalline glucose spectrum.

FIG. 10 presents normalized Raman glucose spectral profiles in venous blood measured using a commercially available FT-Raman spectrometer (Fourier transform Raman spectroscopy), on the basis of which the scattering module 1 has been constructed. The horizontal axis contains the wave number k [cm$^{-1}$] in a range from 300 to 500 cm$^{-1}$, while the vertical axis shows the normalized Raman radiation intensity I, expressed in absolute units [a.u.]. The courses presented in FIG. 10 were obtained after normalizing the spectra measured by means of the spectrometer, and then multiplying them by the crystalline glucose spectrum.

The change in Raman radiation intensity is visible depending on the blood glucose concentration.

Simultaneously, the transmission module is activated 7.

During a routine blood glucose concentration measurement, the multiple calibration of the device is not required, wherein this applies to 70% of patients. Calibration can be performed in order to obtain a higher accuracy, or for persons with unidentified skin lesions, i.e. pathologically altered body balance. In order to perform the calibration, it is necessary to execute several sets of spectra and analyze them. On that basis, the device is calibrated for the specific patient, and the patient's profile is created, which can then be used by that patient to measure the blood glucose level.

It is worth emphasizing, that in the analysis of measurement results it is also possible to use the characteristic peak originating from the emitting optical fiber—PMMA in this embodiment. The benefits resulting from the use of the characteristic peak from the PMMA optical fiber corresponds to benefits arising from using a reference substance, as described in example 3.

Tests on humans and biological samples have been conducted in accordance with resolution no. 6/BOBD/2019 of the Bioethical Commission by the Lower Silesia Medical Chamber.

Figure 11:
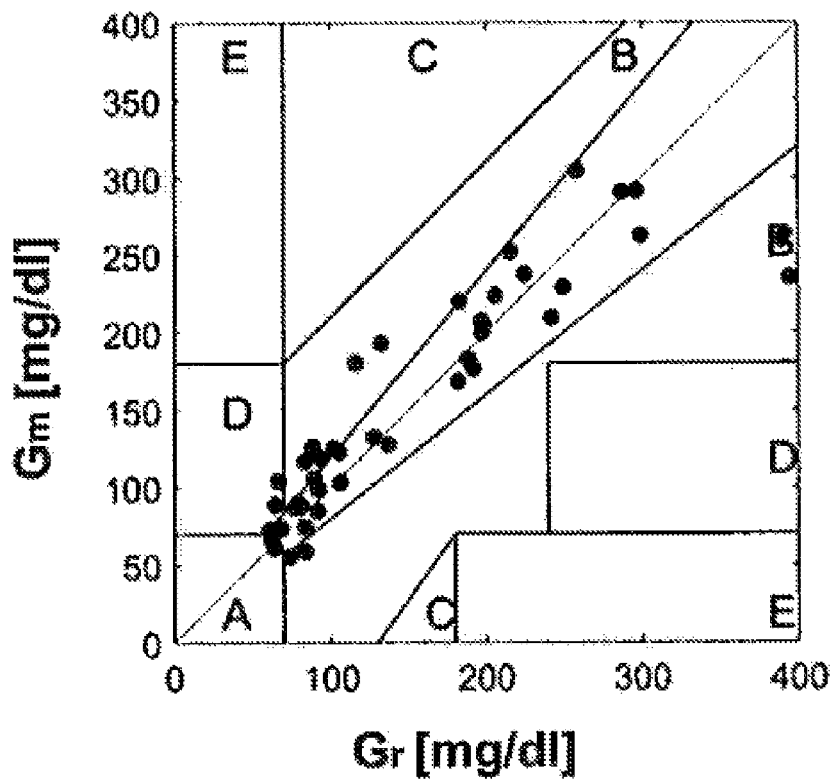
FIG. 11 shows a graph of the blood glucose level determined using the device according to the invention, with an overlay Clark error grid for 44 study participants.

FIG. 11 presents a blood glucose level diagram, determined on the basis of transmission and Raman spectra, with a superimposed Clarke error grid for N=44 study participants. The horizontal axis indicates the reference glucose value ($G_r$) obtained in a laboratory blood sample measurement. The vertical axis indicates the value of glucose determined from a measurement using the device according to the invention ($G_m$).

The Clarke Error Grid (EGA) is a diagram used to present the measurement accuracy of a device for designating the glucose level in a body in relation to a reference value. The diagram is divided into five areas (A-E):
A. the area in which results from the tested device do not exceed a 20% error in relation to the reference value;
B. the area in which results from the tested device exceed a 20% error, but would not lead to applying an incorrect treatment to the patient;
C. the area of results which would lead to applying an incorrect treatment to the patient;
D. the area of results indicating a potentially dangerous failure to detect hypoglycemia or hyperglycemia to a patient;
E. the area of results which could lead to mistakenly applying treatment for hypoglycemia instead of hyperglycemia, or vice-versa.

Most of the calculated results obtained in the conducted measurements fell within the A and B areas of the error grid (95% of all values). This fact proves the clinical utility of the device according to the invention, thus constituting a basis for accurate diagnosis.

Figure 12:
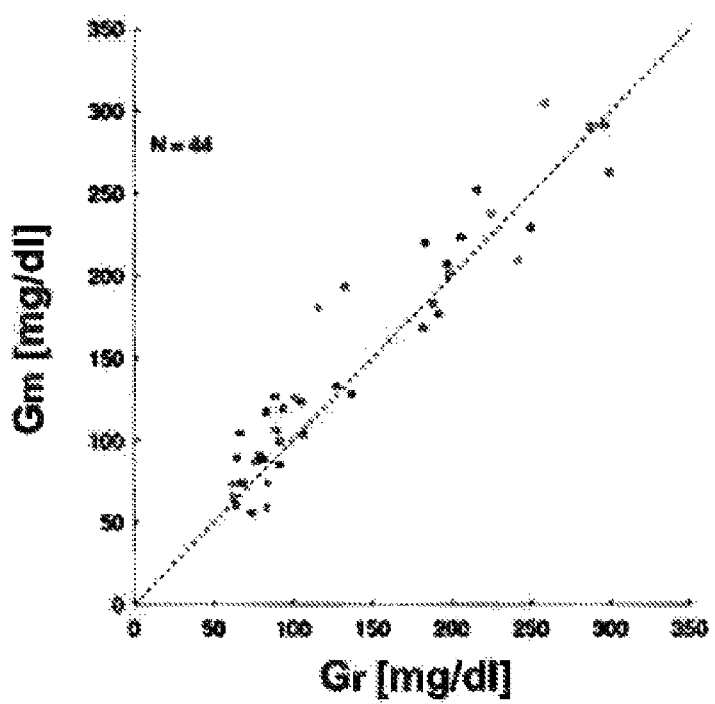
FIG. 12 shows a correlation graph of results calculated using the invention with reference laboratory indications for 44 study participants.

FIG. 12 presents a diagram of the correlations of results calculated using the invention with reference laboratory determinations for N=44 study participants. The horizontal axis indicates the reference glucose value ($G_r$) obtained in a laboratory measurement of a blood sample. The vertical axis indicates the value of glucose determined from a measurement using a device according to the invention ($G_m$). The distribution of points has a linear character, indicating a high correlation of the result calculated by the device with laboratory determination.

Figure 13:
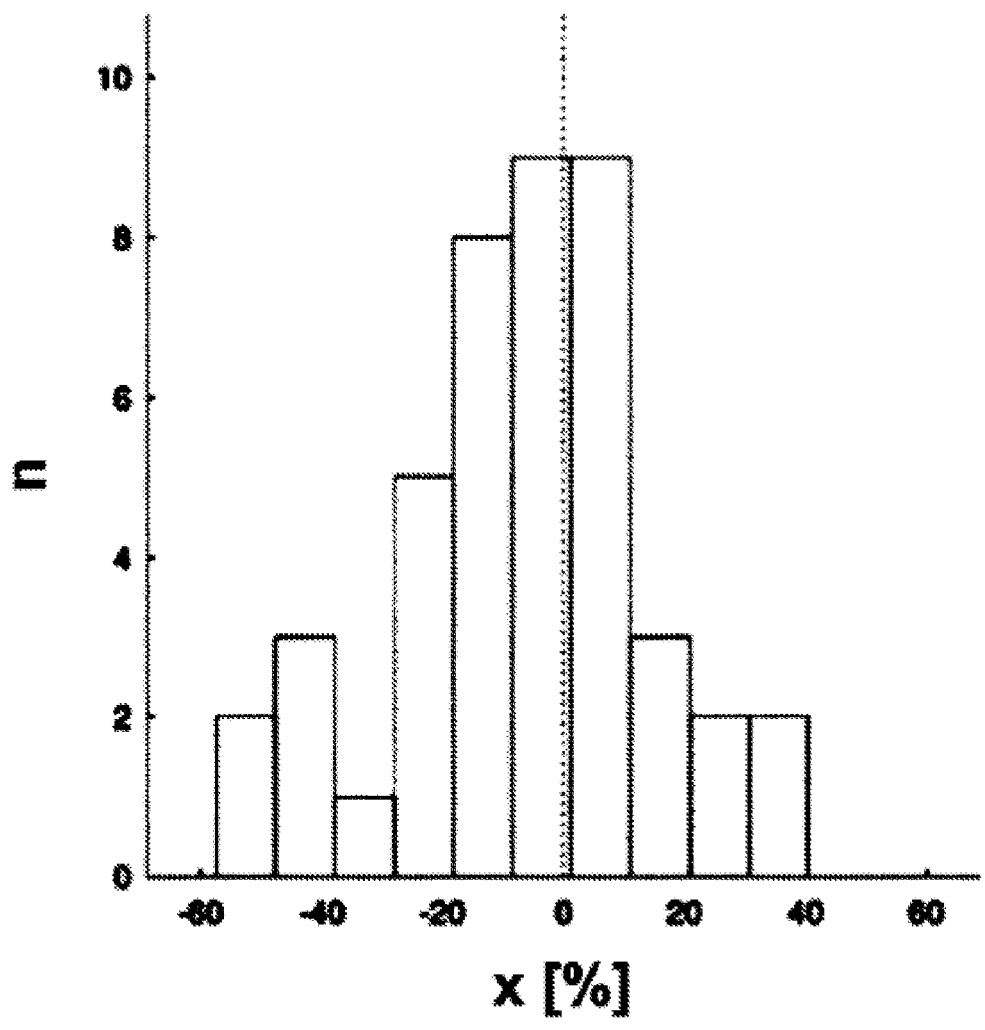
FIG. 13 shows a glucose value calculation error histogram.

In turn, FIG. 13 presents a histogram of the glucose value calculation error. The horizontal axis indicates the approximation error X, while the vertical axis indicates the number of measurements n. The average glucose value estimation error in the experiment using the device according to the invention was 7.4%; 70.5% of the calculated results were characterized by an error below 20%, and including 45.5% of all calculated results which were determined with an error below 10%; 29.5% of calculated results were determined with an error exceeding 20%.

The device, in particular: the central control system 4, the transmission module 7, the control system 8 of the transmission module 7, the optical fiber probe 11, the proximity sensor 12, the transmission module 1, the control system 2 of the transmission module 1, and power supply system 3 in this embodiment are located in a housing 6. A person skilled in the art routinely places the device in the housing, as well as selects the housing itself.

Example 2

Figure 9:
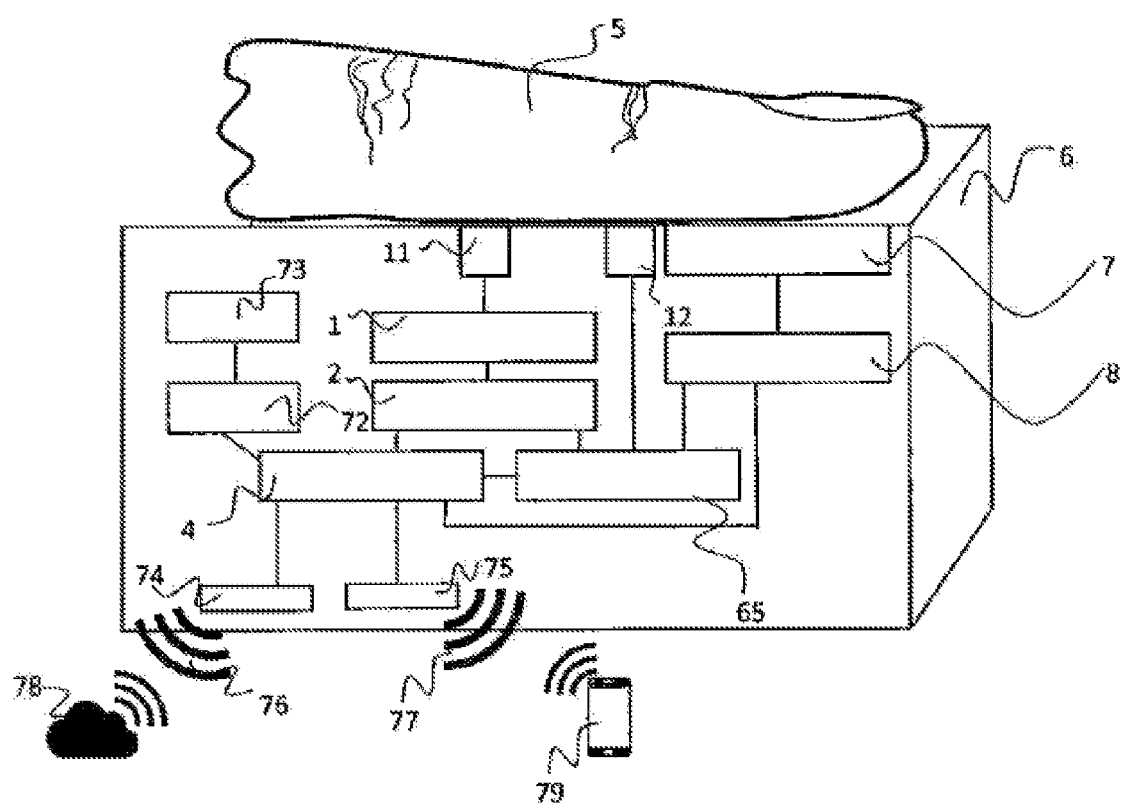
FIG. 9 shows a scheme of the device according to the invention, according to another advantageous embodiment.

The device described in this embodiment is presented in FIG. 9.

The device according to the invention also comprises the scattering module 1 and the transmission module 7, wherein their construction does not differ from corresponding modules described in example 1. The scattering module 1 in this embodiment enables measurement of Raman scattering. The scattering module is realized in a Raman spectrophotometer system.

In this embodiment, the control system 2 of the scattering module 1, as well as the control system 8 of the transmission module 7 are connected to the central control system 4 through a power supply stabilizer system 65.

In this embodiment, the device further comprises a touchscreen 72 for operating the device. The touchscreen 72 enables interaction with the user interface 73.

The proximity sensor 12 is connected to the central control system 4 through the power supply stabilizer system 65.

The central control system 4 in this embodiment is connected to the wireless transmission modules—the Wi-Fi module 74 and the Bluetooth module 75, in order to enable wireless communication with the telemedical system.

The Wi-Fi module enables connection with the data cloud 78 or with a smartphone type device 79 and in particular, the Wi-Fi module enables transfer of data transmitted via Wi-Fi 76 to the data cloud 78, or to a smartphone type device 79. In turn, data transmitted via Bluetooth 77 are transferred via the Bluetooth module 75 to a smartphone type device 79. In this embodiment, it is possible to use only one of the wireless transmission modules—the Wi-Fi module 74, or the Bluetooth module 75, although the use of both is particularly advantageous.

In this advantageous embodiment, the emitting optical fiber 15 and the measuring optical fiber 18 are polystyrene optical fibers with a numerical aperture equal to 0.5. Although polymer optical fibers with a numerical aperture equal to 0.5 are the most easily available commercially, the use of optical fibers with a numerical aperture larger than 0.5 will result in equally good or better performance of the device according to the invention.

Example 3

Figure 14:
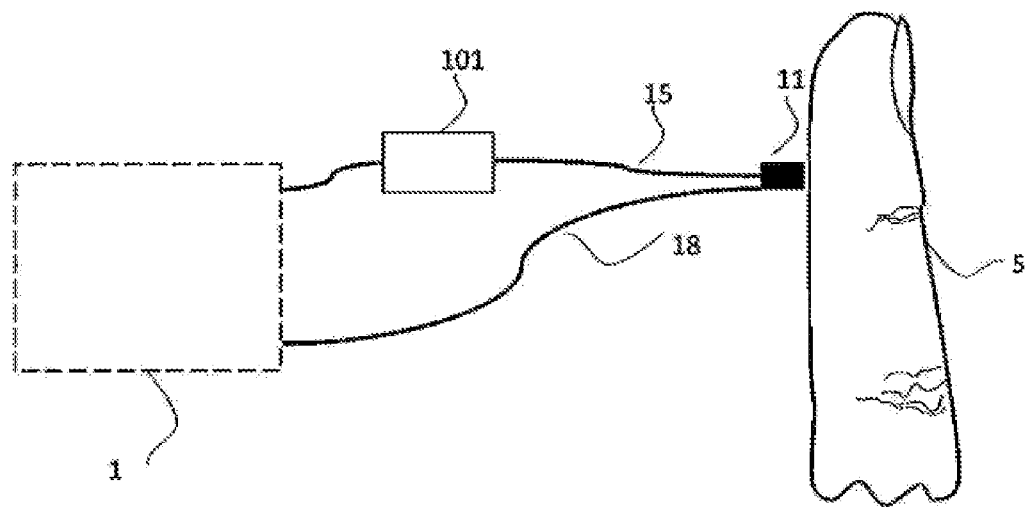
FIG. 14 shows a fragment of the device according to the invention according to another advantageous embodiment, in which a reference module is used.

The device according to this embodiment has been presented in FIG. 14. The scattering module in this embodiment is executed analogously to example 1.

The device additionally comprises a reference module 101, located in the optical path of the emitting optical fiber 15.

The reference module in this embodiment is realized by connecting two optical fiber connectors, between which a reference substance is located. In order to place the reference module 101, in this embodiment, a gap has been executed in the emitting optical fiber, and two optical fiber connectors have been mounted on its ends, which position the fronts of the optical fibers relative to each other. A very small amount of the reference substance was applied to the front of one of the optical fibers, whereupon the connector was screwed together.

In this embodiment HFBR family connectors were used. A person skilled in the art will routinely select other types of connectors which enable application of a reference substance layer onto the core of the optical fiber, and which prevent its damaging by shock or moisture. As an example, another type of connectors which will also perform well in the invention are FSMA type connectors.

The reference substance is chosen in a way in which the intensity of its spectrum is similar to the intensity of the Raman spectrum of the skin. In particular, the reference substance cannot be a substance with a strong Raman spectrum, whose intensity could conceal the effect related to the Raman spectrum of glucose.

Radiation in the emitting optical fiber is of a high intensity, therefore, even a small amount of reference substance will cause visible characteristic peaks. The intensity of the spectrum of the reference substance can also be regulated by changing the amount of the substance.

Use of a reference substance results in appearing of a peak originating from the reference substance in the analyzed spectrum. Because the operating temperature of the scattering module 1 influences the location of the Raman peak, this additional peak originating from the reference substance provides additional information on the amount of light returning to the scattering module 1. Additionally, the coherent source 14 may degrade, i.e. reduce the generated optical power and, despite the general stabilization of its general parameters and sealing, it can also change its characteristic operating point. For that reason, the presence of the additional reference substance peak is particularly convenient.

Having two narrow peaks in the output spectrum: both their magnitude for characteristic exposure times, as well as arrangement on the detection element, it is possible to determine the actual power of the coherent source 14.

Additionally, the presence of a reference module increases the sensitivity and measuring resolution of the device according to the invention, enables extended operation without a need for servicing.

The arrangement of the aforementioned characteristic peaks from glucose and the reference substance allows automatic calibration of the device reading the spectrum split (analyzed) by the dispersion module. Because every portable device is subject to shock, in the device according to the invention even minor shift of optical elements can result in a so called spectrum offset and cause errors in further analysis. The ability to analyze the characteristic peak from a reference substance translates to the ability to analyze the technical condition of the entire optical path, and increases the measurement resolution and accuracy.

In this embodiment, crystalline sulfur is used as the reference substance.

Example 4

Figure 15:
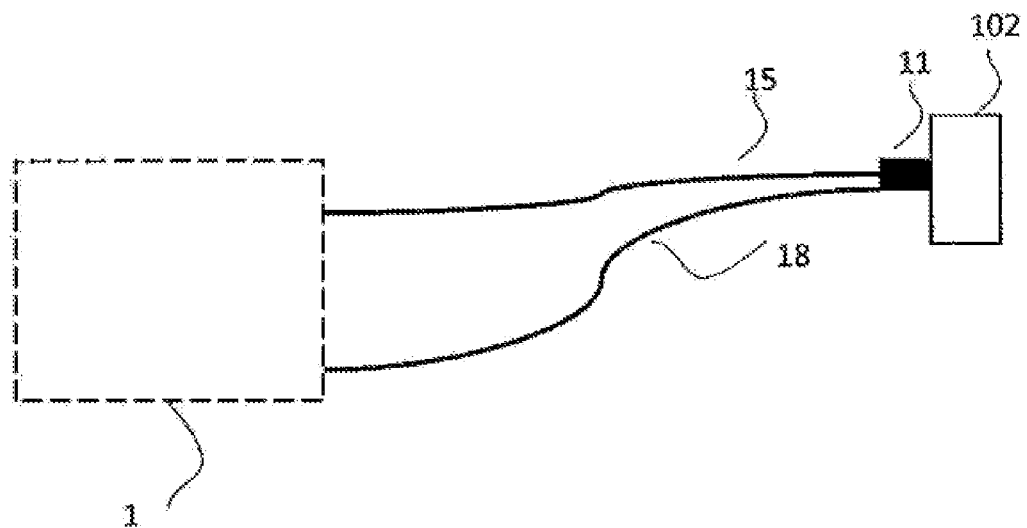
FIG. 15 shows a fragment of the device according to the invention according to yet another advantageous embodiment, in which a reference module is used.

The device according to this embodiment has been presented in FIG. 15. The scattering module in this embodiment is realized analogously to example 2.

The device additionally comprises a reference module 102 located at the end of the optical fiber probe 11. In this embodiment, the reference module 102 constitutes an overlay on the optical fiber probe 11.

In this embodiment, the reference module 102 comprises a reference substance placed between quartz glass plates. On the side opposite from the optical fiber probe 11, the reference module is shielded against ambient radiation, e.g. using an anodized aluminum plate.

The reference module 102 enables insertion of a reference substance over the optical fiber probe 11, quick preliminary measurement, followed by removal of the substance and actual measurement after pressing the optical fiber probe 11 to the skin. Placement of the reference module 102 above the optical fiber probe 11 and pushing back the reference module 102 may take place automatically.

A person skilled in the art will select other methods of inserting the reference substance in the reference module 102, as well as perform placement of the reference module 102 over the optical fiber probe 11.

In this embodiment, the chosen reference substance is polystyrene. An equally effective reference substance is PMMA and crystalline sulfur.

LIST OF REFERENCE SIGNS

1 Scattering module
2 Control system of the scattering module 1
3 Power supply system
4 Control system of the non-invasive glucose concentration measurement device
5 Patient
6 Device housing
7 Transmission module
8 Control system of the transmission module 7
9 Computer
10 USB connection
11 Optical fiber probe
12 Proximity sensor
13 Control system of the coherent radiation source
14 Coherent source
15 Emitting optical fiber
18 Measuring optical fiber
19 Optical system of the radiation collimator
20 Collimated light beam
21 High-pass filter
22 Light beam after passing through the high-pass filter
23 Diffractive slit
24 Dispersing module
25 Split beam
26 Focusing lens
27 Focused light beam
28 Detection element
29 Measuring signal
33 Distal infrared radiation emitter
34 Proximal infrared radiation emitter
35 Infrared radiation detector
37 Light wave propagated between the distal infrared radiation emitter 33 and the infrared radiation detector 35
38 Light wave propagated between the distal infrared radiation emitter 34 and the infrared radiation detector 35
39 PCB assembly board
40 Silica optical fiber core
41 Silica optical fiber cladding
42 Cone of acceptance for the silica optical fiber 43 PMMA optical fiber core
44 Cone of acceptance for the PMMA optical fiber
45 PMMA optical fiber core
46 Excitation signal
48*b* Cone of acceptance for the emitting optical fiber 15
49*b* Shared area of areas 48*b* and 50*b*
50*b* Cone of acceptance for the measuring optical fiber 18
51*a* Measuring glass optical fiber i.e. receiving
52 Measuring signal
56 Assembly glue
58 Assembly sleeve
65 Power supply stabilizer system
72 Touchscreen
73 User interface
74 Wi-Fi module
75 Bluetooth module
76 Data transmitted via Wi-Fi
77 Data transmitted via Bluetooth
78 Data cloud
79 Smartphone type device
101 Reference module
102 Reference module

What is claimed:

1. A device for non-invasive blood glucose concentration measurement, comprising:
   a central control system;
   a scattering module having an electronic control system of the scattering module connected to the scattering module, wherein the electronic control system of the scattering module is connected to the central control system, the scattering module comprises a detection element and a coherent radiation source connected to the coherent radiation source control system;
   a transmission module having an electronic control system of the transmission module connected to transmission module, the transmission module being connected to the central control system, wherein the transmission module comprises a distal infrared radiation emitter and a proximal infrared radiation emitter and an infrared radiation detector; and
   a proximity sensor that is connected to the central control system and an optical fiber probe comprising an emitting optical fiber and a measuring optical fiber, wherein the emitting optical fiber is connected to the coherent radiation source and the measuring optical fiber is connected to the detection element, wherein the emitting optical fiber and the measuring optical fiber are parallel to each other within the optical fiber probe and both the emitting optical fiber and the measuring optical fiber have a numerical aperture higher or equal to 0.5.

2. The device of claim 1, wherein the distal infrared radiation emitter and the proximal infrared radiation emitter are semiconductor diodes.

3. The device of claim 2, wherein the distal infrared radiation emitter and the proximal infrared radiation emitter have the same emission wavelength.

4. The device of claim 2, wherein the infrared radiation emitting semiconductor diodes are selected from a group comprising diodes with emission wavelengths of 850 nm, 940 nm, and 1300 nm.

5. The device of claim 1, further comprising a power supply stabilizer system which supplies power to the control system of the scattering module, the control system of the transmission module, and the proximity sensor.

6. The device of claim 1, wherein the central control system is connected to a touchscreen.

7. The device of claim 1, wherein the central control system is connected to a wireless transmission module.

8. The device of claim 1, wherein the optical fiber probe comprises an assembly sleeve in which, using a glue, the emitting optical fiber and the measuring optical fiber are mounted.

9. The device of claim 1, wherein the emitting optical fiber and the measuring optical fiber are polymer optical fibers.

10. The device of claim 9, wherein the polymer optical fibers which constitute the emitting optical fiber and the measuring optical fiber have a cladding diameter of 1 mm.

11. The device of claim 1, further comprising a reference module comprising a reference substance.

12. The device of claim 11, wherein the reference module is located inside the optical path of the emitting optical fiber.

13. The device of claim 11, wherein the reference module is an overlay on the optical fiber probe.

* * * * *